W. S. JONES.
MOTOR ATTACHMENT FOR VEHICLES.
APPLICATION FILED DEC. 29, 1909.
967,931.
Patented Aug. 23, 1910.
3 SHEETS—SHEET 1.
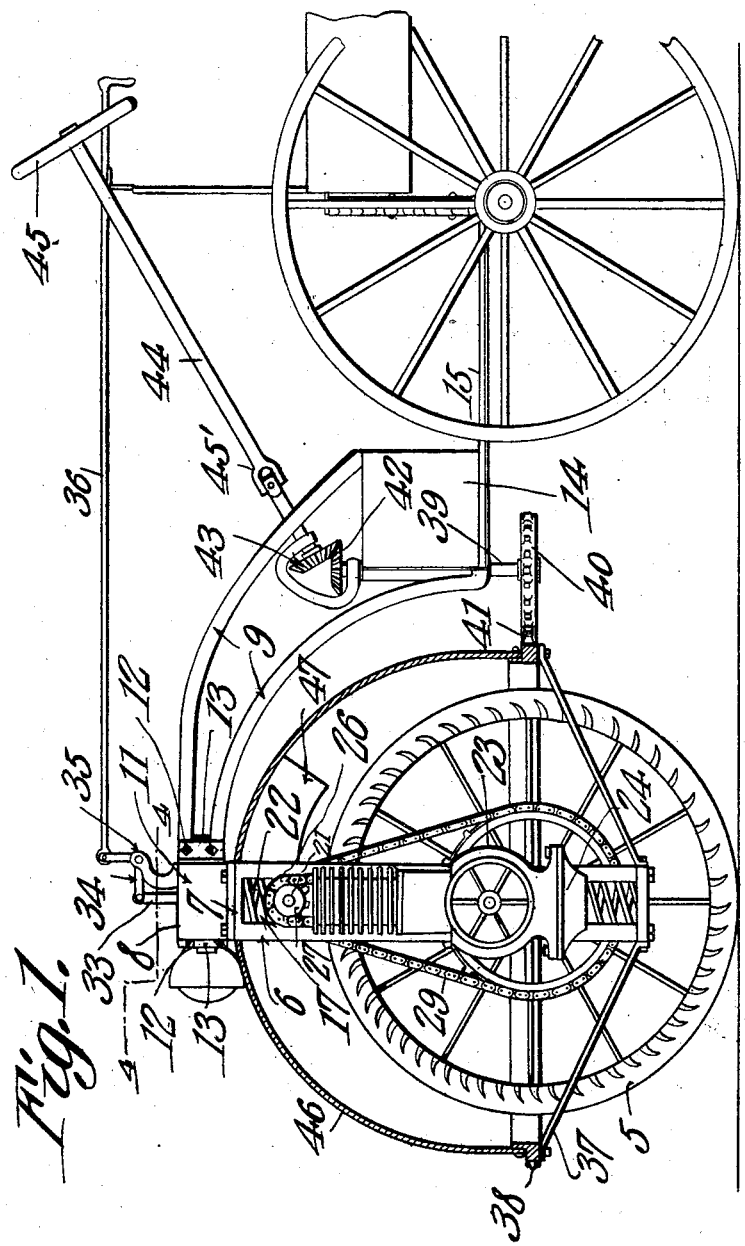
Witnesses
Inventor
Watt S. Jones.
By C. A. Snow & Co.
Attorneys

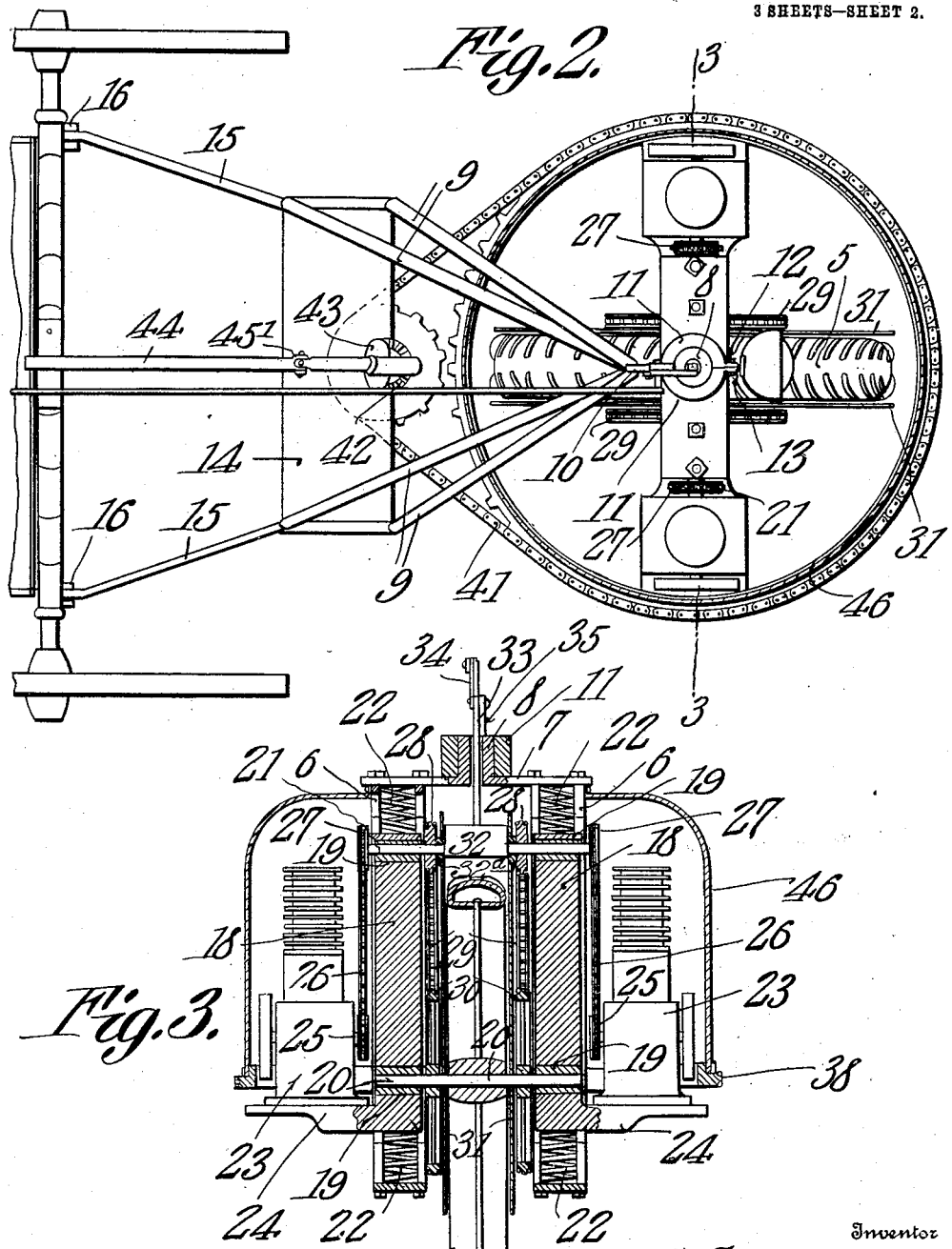

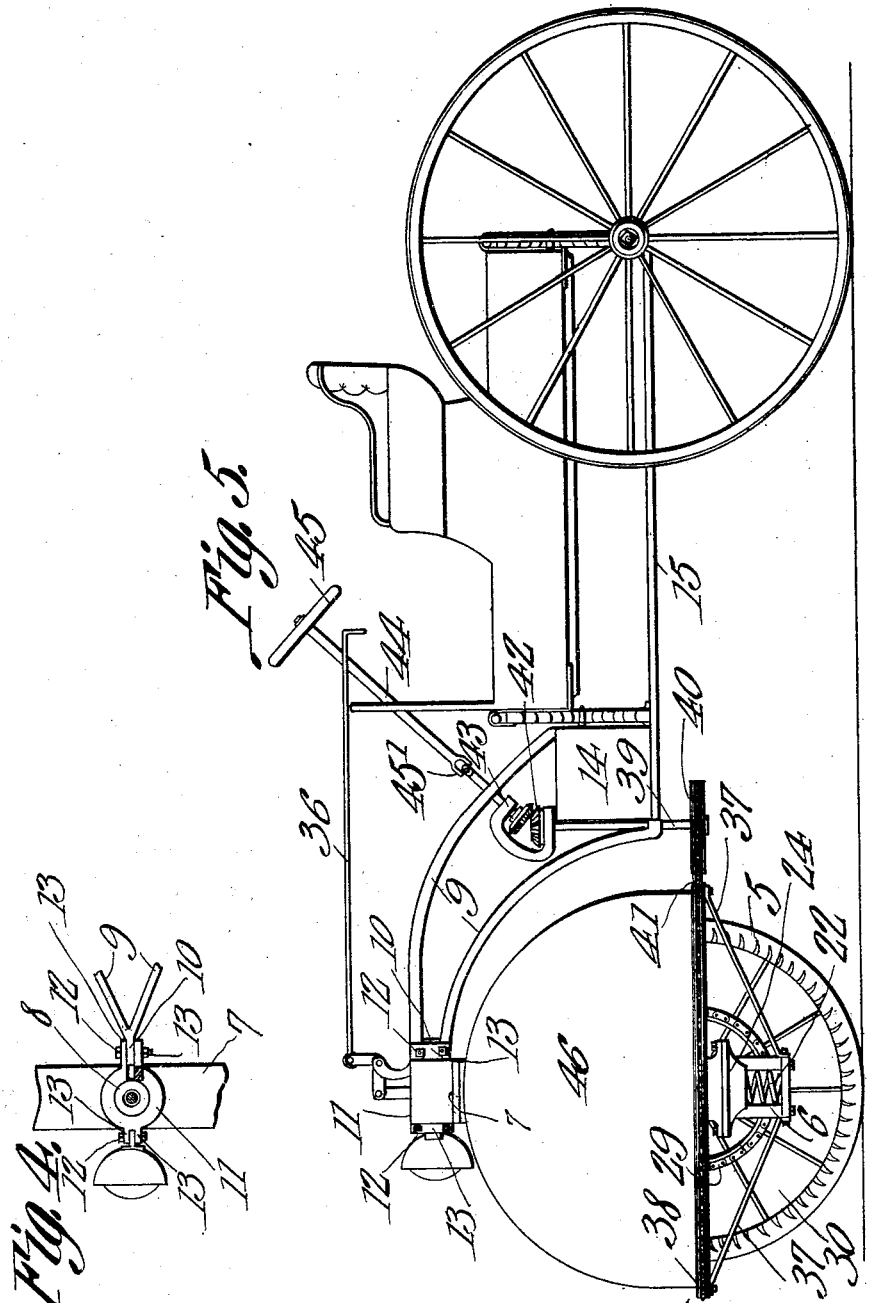

UNITED STATES PATENT OFFICE.

WATT SAMUEL JONES, OF BAXTER SPRINGS, KANSAS.

MOTOR ATTACHMENT FOR VEHICLES.

967,931.  Specification of Letters Patent.  Patented Aug. 23, 1910.

Application filed December 29, 1909. Serial No. 535,525.

*To all whom it may concern:*

Be it known that I, WATT SAMUEL JONES, a citizen of the United States, residing at Baxter Springs, in the county of Cherokee and State of Kansas, have invented a new and useful Motor Attachment for Vehicles, of which the following is a specification.

This invention relates to motor attachments for horse-driven vehicles, characterized by a wheeled frame which is adapted to be connected to the vehicle to be propelled, said frame carrying a motor which is geared to the wheels thereof, for driving the same.

It is the object of the present invention to provide an improved supporting frame for the drive wheel, which is cushioned, so as to absorb shocks due to rough roads, and other causes.

The invention also has for its object to provide an improved steering mechanism for the drive wheel.

With these objects in view, the invention consists in a novel construction and arrangement of parts to be hereinafter described and claimed, reference being had to the drawings hereto annexed in which, Figure 1 is an elevation showing the application of the invention. Fig. 2 is a plan view. Fig. 3 is a transverse section on the line 3—3 of Fig. 2. Fig. 4 is a horizontal section on the line 4—4 of Fig. 1. Fig. 5 is an elevation showing a modification.

Referring to the drawings, the drive wheel 5 is supported in a forked frame comprising branches 6, connected at the top by a plate 7, from the center of which rises a tubular stem 8. The fork is pivoted to a frame comprising side bars 9, which converge at one of their ends, and terminate in an ear 10 which is clamped between the ends of a split sleeve 11 encircling the stem 8, and secured thereto by bolts 12 passing through outstanding ears 13 formed at the ends of the sleeve, the part 10 being received between the ears at one of the ends of the sleeve, and secured by the bolt passing therethrough. The sleeve 11 is sufficiently loose on the stem 8, to permit the fork to freely turn. The fork swings on a vertical axis to permit the wheel 5 to be steered. The rear ends of the side bars 9 are connected to a box 14, in which tools, etc., may be carried. From the rear end of the box 14 extend braces 15 adapted to be secured to the thill coupling 16 of the vehicle to which the attachment is to be applied, the shafts being removed. The attachment is thus readily connected to the front axle of the vehicle, and no specially constructed vehicle is necessary. If desired, the braces 15 may be made longer, and connected to the rear axle of the vehicle, the front spring of the buggy or other vehicle resting on the front ends of the braces, and the front wheels being removed, as shown in Fig. 5.

The branches 6 have vertical slots 17 in which are slidably mounted blocks 18 carrying boxes 19 for the axle 20 of the drive wheel 5, and the drive shaft 21 of said wheel. The drive wheel 5 is carried on the axle 20, between the branches. Between the upper and lower ends of the slots 16 and the adjacent ends of the blocks 18, are interposed coiled springs 22. By mounting the axle 20 in the blocks 18, the fork is movable up and down relatively to the drive wheel 5, this movement being opposed by the springs 22, whereby the wheel is cushioned, and all shocks due to rough roads, etc., are absorbed.

The wheel 5 is driven by a pair of internal combustion engines, or other suitable motors 23 mounted on platforms 24 carried by the blocks 18, one of the motors being mounted on one side of the attachment, and the other motor on the other side, so as to balance the same. On the crank shaft of each motor is a sprocket wheel 25 which is connected by a chain 26 to a sprocket wheel 27 on the shaft 21. Between the branches 6, the shaft 21 is provided with loose sprocket wheels 28 connected by chains 29 to sprocket wheels 30 on the axle 20. The chains 29 are located on opposite sides of the wheel 5, and between said wheel and chains are located guards or fenders 31, for preventing the wheel from throwing mud on the chains and sprocket wheels.

On the shaft 21 is a casing 32 containing suitable clutch devices 32ª which extend therefrom into engagement with the sprocket wheels 28 for locking the latter on the shaft 21, said devices being operated by a stem 33 passing through the bore of the stem 8, and connected to a bell crank lever 34 fulcrumed on a bracket 35 mounted on the upper end of the sleeve 11. To the bell crank lever is connected an operating rod 36, extending rearwardly to the vehicle, within easy reach of the driver.

To the fork is connected, by braces 37, a large horizontally disposed sprocket wheel 38 encircling the fork. The box 14 carries a vertical shaft 39 on which is a sprocket wheel 40 connected to the sprocket wheel 38 by a chain 41. On the shaft 39 is a bevel gear 42 which is in mesh with a bevel gear 43 on a steering shaft 44 provided with a hand wheel 45. The steering shaft extends rearwardly to the vehicle within easy reach of the driver, and it is in two sections which are connected by a universal joint 45'. Rotation of the bevel gears by the shaft 44, through the sprocket and chain gearing, swings the fork on its pivot, and thus steers the wheel 5. By giving the fork a complete turn the direction in which the vehicle is driven is reversed, the wheel then running backward.

At 46 is indicated a hood entirely inclosing the two motors, this hood being in two sections, secured at their lower ends to the sprocket wheel 38, and at their upper ends to the branches 6. Said branches also carry a tank 47 containing the fuel of the motors.

The rim of the drive wheel 5 is of metal, and made tubular, and the tread is formed with traction spurs 48 to prevent slipping.

The attachment herein described is simple in structure, and can be readily connected to the vehicle. It runs easy and is readily controlled, and therefore effectually serves the purpose for which it is designed.

What is claimed is:

1. A motor attachment for vehicles comprising a frame, means for connecting the same to the vehicle, a fork carried by the frame, the branches of the fork being slotted vertically, blocks yieldingly mounted in said slots, an axle and a shaft carried by the blocks, and extending between the fork branches, a wheel mounted on the axle, a motor geared to the shaft, and a gearing between the shaft and the axle.

2. A motor attachment for vehicles comprising a frame, means for connecting the same to the vehicle, a fork carried by the frame, the branches of the fork being slotted, blocks yieldingly mounted in said slots, an axle and a shaft carried by the blocks, and extending between the fork branches, a wheel mounted on the axle, a platform carried by the blocks, motors mounted on the platform, and geared to the shaft, and a gearing between the shaft and the axle.

3. A motor attachment for vehicles comprising a frame, means for connecting the same to the vehicle, a fork carried by the frame, the branches of the fork being slotted, blocks being slidably mounted in the slots, springs mounted in the slots, and engageable with the upper and lower ends of the blocks, an axle and a shaft carried by the blocks, and extending between the fork branches, a wheel mounted on the axle, a motor geared to the shaft, and a gearing between the shaft and the axle.

4. A motor attachment for vehicles comprising a frame, means for connecting the same to the vehicle, a fork having its stem pivotally connected to the frame, and the branches of the fork being slotted, and the stem having a central opening, blocks yieldingly mounted in the slots, an axle and a shaft carried by the blocks, and extending between the fork branches, a wheel mounted on the axle, a motor geared to the shaft, and a gearing between the shaft and the axle, a controlling mechanism for the shaft mounted between the fork branches, and means for actuating said mechanism passing through the opening of the fork stem.

In testimony that I claim the foregoing as my own, I have hereto affixed my signature in the presence of two witnesses.

WATT SAMUEL JONES.

Witnesses:
W. M. JONES,
CLAUDES DOW GUFFEY.